(12) United States Patent
Menon et al.

(10) Patent No.: US 12,391,489 B2
(45) Date of Patent: Aug. 19, 2025

(54) INTEROPERABLE ROBOTIC SYSTEM TO LOAD/UNLOAD TRUCKS AND OTHER CONTAINERS

(71) Applicant: Dexterity, Inc., Redwood City, CA (US)

(72) Inventors: Samir Menon, Atherton, CA (US); Zhouwen Sun, Redwood City, CA (US); Robert Holmberg, Mountain View, CA (US); Michael Fisher, Palo Alto, CA (US); David Turney, Redwood City, CA (US)

(73) Assignee: Dexterity, Inc., Redwood City, CA (US)

( * ) Notice: Subject to any disclaimer, the term of this patent is extended or adjusted under 35 U.S.C. 154(b) by 170 days.

(21) Appl. No.: 18/214,938

(22) Filed: Jun. 27, 2023

(65) Prior Publication Data

US 2024/0002163 A1    Jan. 4, 2024

Related U.S. Application Data

(60) Provisional application No. 63/356,896, filed on Jun. 29, 2022.

(51) Int. Cl.
*B65G 43/10*  (2006.01)
*B65G 41/00*  (2006.01)
*B65G 41/02*  (2006.01)

(52) U.S. Cl.
CPC .......... *B65G 43/10* (2013.01); *B65G 41/001* (2013.01); *B65G 41/02* (2013.01); *B65G 2203/0283* (2013.01)

(58) Field of Classification Search
CPC ...................................... B65G 43/10

USPC ........................................... 198/575; 700/248
See application file for complete search history.

(56) References Cited

U.S. PATENT DOCUMENTS

| | | | | |
|---|---|---|---|---|
| 7,844,364 B2 * | 11/2010 | McLurkin | ............. | G06N 3/008 |
| | | | | 700/245 |
| 11,054,811 B2 * | 7/2021 | Akella | .................. | G06N 20/00 |
| 2019/0015981 A1 | 1/2019 | Yabushita | | |
| 2019/0375104 A1 | 12/2019 | Moriya | | |
| 2020/0095001 A1 | 3/2020 | Menon | | |
| 2023/0098602 A1 * | 3/2023 | Cella | ....................... | B25J 9/1674 |
| | | | | 700/248 |
| 2023/0102048 A1 * | 3/2023 | Cella | ..................... | B25J 9/1661 |
| | | | | 700/248 |
| 2023/0219230 A1 * | 7/2023 | Cella | .................... | G06N 3/0464 |
| | | | | 700/248 |
| 2024/0067459 A1 * | 2/2024 | Kimura | ................. | B65G 43/10 |

\* cited by examiner

*Primary Examiner* — Gene O Crawford
*Assistant Examiner* — Lester Rushin, III
(74) *Attorney, Agent, or Firm* — Van Pelt, Yi & James LLP

(57) ABSTRACT

A robotic system is disclosed comprising a communication interface and a processor coupled to the communication interface and configured to: receive via the communication interface an indication to establish a conveyance path to convey one or more items from a source location at an originating end of the conveyance path to a destination location at a terminating end of the conveyance path; determine programmatically a plan to arrange and configured one or more conveyance structures to provide the conveyance path; and invoke one or more robots to position, couple as needed, and configure as needed the one or more conveyance structures to provide the conveyance path.

19 Claims, 9 Drawing Sheets

INTEROPERABLE ROBOTIC SYSTEM TO LOAD/UNLOAD TRUCKS AND OTHER CONTAINERS

CROSS REFERENCE TO OTHER APPLICATIONS

This application claims priority to U.S. Provisional Patent Application No. 63/356,896 entitled INTEROPERABLE ROBOTIC SYSTEM TO LOAD/UNLOAD TRUCKS AND OTHER CONTAINERS filed Jun. 29, 2022 which is incorporated herein by reference for all purposes.

BACKGROUND OF THE INVENTION

Robotic systems have been used to automate warehouse, shipping, and order fulfillment operations. Increasingly, robots work autonomously to perform tasks, such as to pick and place items in a box or other receptacle for shipment.

Typically, different mixes of installed, portable, and/or variable geometry equipment have been used in warehouses, distribution centers, etc. to load boxes or other items to or from trucks or other containers. For example, typically human workers load boxes or other items onto a chute or conveyor, and items are moved to or from a loading area, such as a loading dock, by one or more of gravity; electrical motor driven belts, wheels, or rollers; and manual pushing or pulling, such as by a human worker.

At the truck or container, typically human workers receive items via a conveyor or similar structure and load them into the truck or container, or human workers unload items manually from the truck and place them on a conveyor or similar structure to be moved into the warehouse and towards a downstream destination, such as a shelf or other storage location within the warehouse.

Often, a mix of dissimilar, manually placed, configured, and operated conveyance structures are used to move items to or from trucks or other containers.

BRIEF DESCRIPTION OF THE DRAWINGS

Various embodiments of the invention are disclosed in the following detailed description and the accompanying drawings.

DETAILED DESCRIPTION

Figure 1:
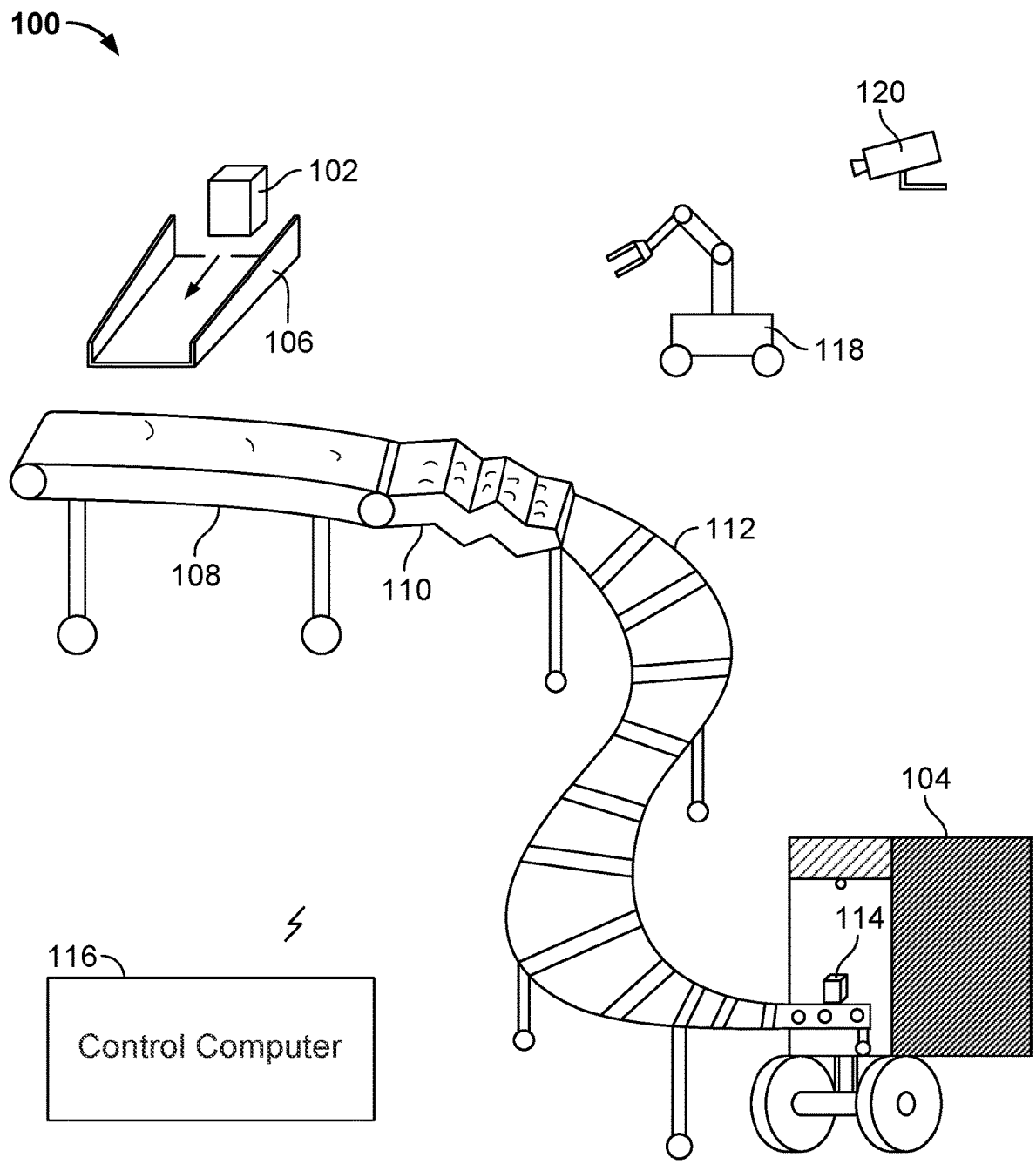
FIG. 1 illustrates an embodiment of a robotic system and environment 100.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An autonomous, integrated robotic system is disclosed to move items to and from and/or into and out of trucks or other containers for loading and unloading operations. In various embodiments, a system as disclosed herein incorporates a plurality of dissimilar conveyance structures, including without limitation one or more chutes, gravity-based roller conveyors, and/or other gravity-based conveyance structures; electrically driven conveyor belts or other powered conveyance structures; and variable length or other variable geometry conveyances structures, such as gravity based conveyance structures and compress or extend and/or conveyor belts that extend or retract, manually or under power, such as from a loading dock into a truck or other container.

In various embodiments, a robotic system as disclosed herein is configured to assemble and adjust one or more conveyance structures, as needed, to assemble an operable and continuous path from a source or items to a destination within a warehouse or similar facility, such as from a storage and/or staging area to a truck or other container for loading or from a truck or other container to a receiving area for unloading.

In some embodiments, a conveyance structure may be required to be positioned and configured manually, such as by moving the structure to a starting location and extending or otherwise positioning the ends and/or intermediate structures of the conveyance structure in desired positions, and configuring the ends and/or intermediate structures as needed to assemble the path, such as by adjusting the height to ensure items move along the conveyance as a result of the force of gravity and/or to align the end of one conveyance structure with the start of another.

In some embodiments, one or more conveyance structures may be movable and/or configurable under their own motive force. For example, an end or each end of the conveyance structure may be on wheels or treads or other mobile base. A robotic system as disclosed herein may determine a location and configuration for such a conveyance and control the conveyance to position and configure the conveyance.

In some embodiments, a robotic system as disclosed herein may use one or more mobile robots to pull or push or otherwise place a conveyance structure into position. A robot may be used to connect a terminal end of one conveyance structure to the beginning end of the next. A robot may be used to configure a conveyance structure, such as by adjusting the height at one end or both ends. For example, a robot may be equipped with a tool to insert into a receiver associated with mechanical adjustment of height and may rotate the receiver to raise or lower the height. Or a robot or remote robotic control computer may actuate a pneumatic or electrical mechanism of the conveyance structure that is provided and configured to raise and lower the height.

In various embodiments, a robotic system as disclosed herein includes a control computer configured to determine a need to move a set of items from a storage and/or staging location to a truck or other container, or vice versa, develop a plan to position and configure a set of one or more conveyance structures to move the items, and use robots and/or robotically controlled facilities of the conveyance structures to position and configure the conveyance structures, as needed, to assemble and configure the path between the storage/staging area(s) and the truck or other container.

FIG. 1 illustrates an embodiment of a robotic system and environment 100. In the example shown, a box 102 to be loaded into a truck 104 starts its journey by being slid down a chute 106 to a belt type conveyor 108 having an extendable end 110 comprising gravity (or motor driven) rollers positioned between accordion-style extendable sides 114. The extendable end 110 of conveyor 108 has been positioned to be aligned with and at the same height as a receiving end of extendable and bendable gravity roller 112, a far end of which is shown to have been extended into (or near) the opening of truck 104. In the example shown, the box 114 has traveled the entire path (chute 106, conveyor 108 and end 110, and roller 112) and is ready to be loaded into the truck 104, e.g., by a human worker or a robot.

In the example shown in FIG. 1, in various embodiments, one or more of the chute 106, conveyor 108, end 110, and roller 112 may have been positioned and/or configured by control computer 116. For example, control computer 116 may have operated robotically controlled capabilities of the chute 106, conveyor 108, end 110, and roller 112 to positioned and/or configure them, such as by adjusting heights to facilitate the flow of items by gravity from the start end of rollers 112 to the destination end. In some embodiments, the control computer 116 may have operated one or more robots, such as mobile robot 118 in the example shown, to position and/or configure one or more of the chute 106, conveyor 108, end 110, and roller 112. In various embodiments, the control computer 116 uses images from cameras in the workspace, such as camera 120, to locate, position, and configure conveyance structures, such as the chute 106, conveyor 108, end 110, and roller 112, and/or to load, unload, or move items along the path comprising the chute 106, conveyor 108, end 110, and roller 112.

Figure 2A:
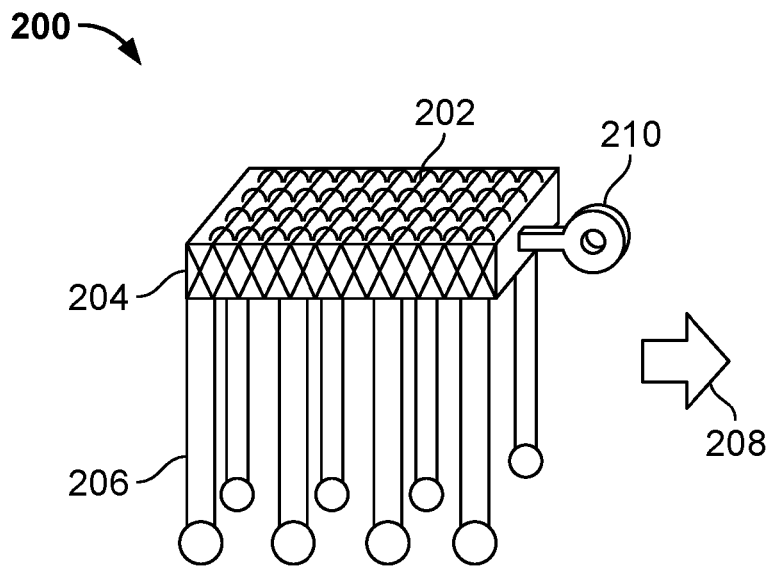
FIGS. 2A and 2B illustrate an example of an extendable roller type conveyance structure, such as roller type conveyance 112 of FIG. 1.
Figure 2B:
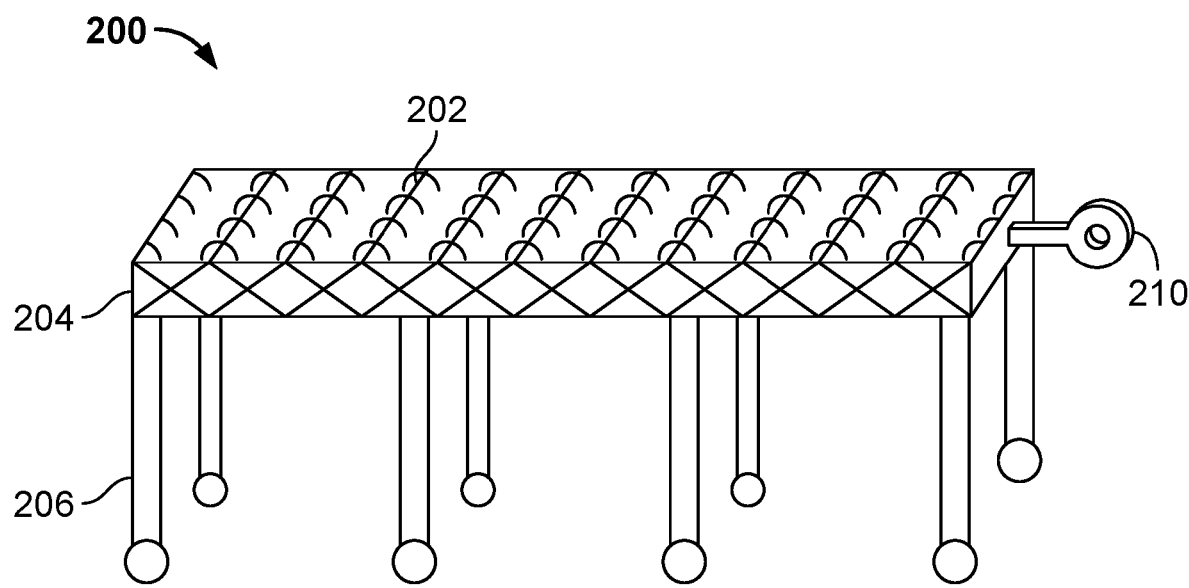

FIGS. 2A and 2B illustrate an example of an extendable roller type conveyance structure, such as roller type conveyance 112 of FIG. 1. In the example shown, in upper FIG. 2A roller 200 is shown in an un-extended or compressed state, scissor type extendable sides 204 are in the compressed position and legs 206 are relatively near each other. Rollers or wheels 202 ride on transverse axles positioned between the sides 204 and in the state shown in FIG. 2A are nearly adjacent. To deploy the roller 200, the right side may be pulled out while the left side remains stationary, as indicated by the arrow 208. In this example, a handle or hitch 210 is provided, to facilitate a human worker, a robot, or another robotically controlled instrumentality to be used to extend the roller 200, e.g., into the extended state shown in FIG. 2B.

In some embodiments, the legs 206 on at least the ends of roller 200 may be equipped with manual, mechanical, electrical, and/or pneumatic structures to adjust the height of the associated end of roller 200, e.g., to facilitate translation along the roller 200 by force of gravity. For example, one or more of the angle (if any) of the floor (i.e., difference in height between the wheels), the length to which the roller 200 has been extended, the (average/median/maximum/minimum) weight of items to be moved along the roller 200, etc., may be taken into account to determine and adjust the height at one or both ends, in addition to the height of adjacent conveyance structures or other structures or instrumentalities.

Figure 3A:
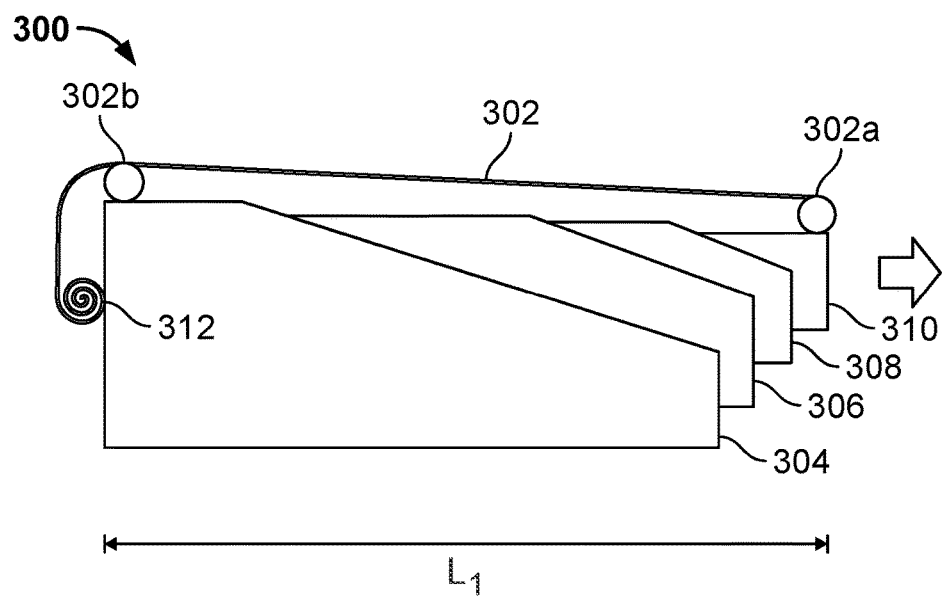
FIGS. 3A and 3B illustrate an example of an extendable belt type conveyor 300.
Figure 3B:
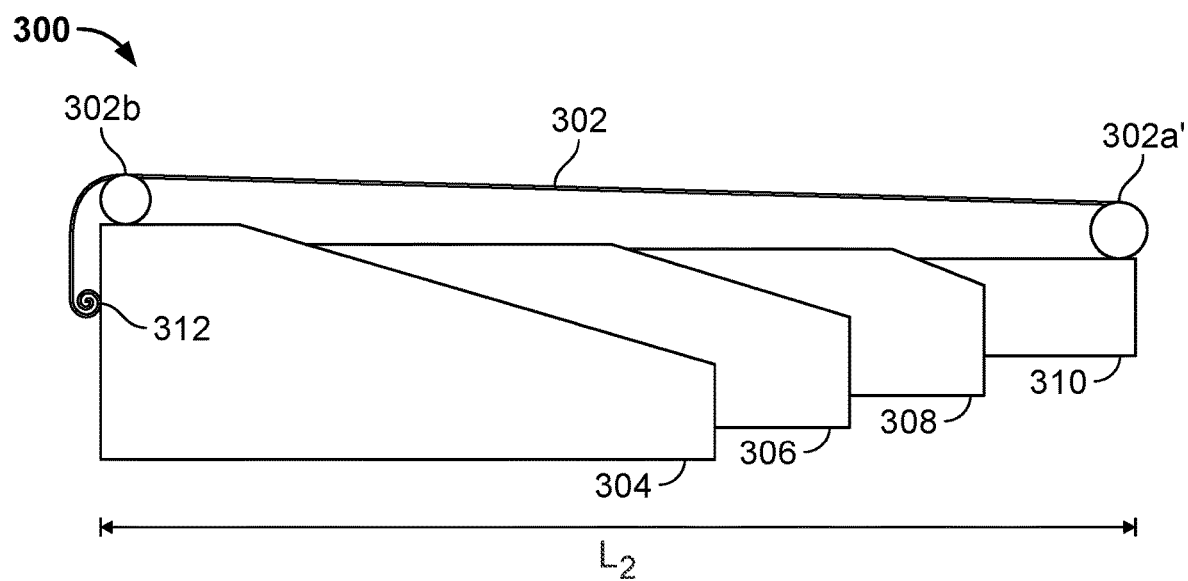

FIGS. 3A and 3B illustrate an example of an extendable belt type conveyor 300. In the upper FIG. 3A, the conveyor 300 is shown in a retracted state (length L1), while in FIG. 3B the conveyor 300 is shown in an extended state (length L2). The conveyor 300 includes a belt 302 driven by motor powered rollers or wheels 302a, 302b. A stationary base 304 houses nested extendable segments 306, 308, and 310, which extend telescopically, as shown in FIG. 3B, to extend the right end of conveyor 300, as shown, e.g., into a truck or other container that has pulled up to and/or otherwise been positioned on or adjacent to a loading dock.

In the retracted state shown in FIG. 3A, for example, excess conveyor belt material is held in a spool 312. As the conveyor 300 is extended, additional belt material is deployed from the spool 312, as shown in FIG. 3B.

In various embodiments, an extendable conveyor, such as conveyor 300, may be operated under robotic control. For example, a control computer, such as control computer 116 of FIG. 1, may use image or other sensor data to determine that a truck has been positioned at a loading bay with which the conveyor 300 is associated, and may send a command or other signal to cause the conveyor 300 to extend, e.g., to the state shown in FIG. 3B, to an extent such that the right end of the conveyor 300 is in or near the truck or other container.

In some embodiments, a conveyor such as conveyor 300 includes structures to adjust the height of one or both ends of the conveyor 300, such as by raising or lower one or both ends of the base 304 or by adjusting the relative height and/or position of structures comprising and/or supporting belt 302, e.g., to place one or both ends at a desired height.

Figure 4A:
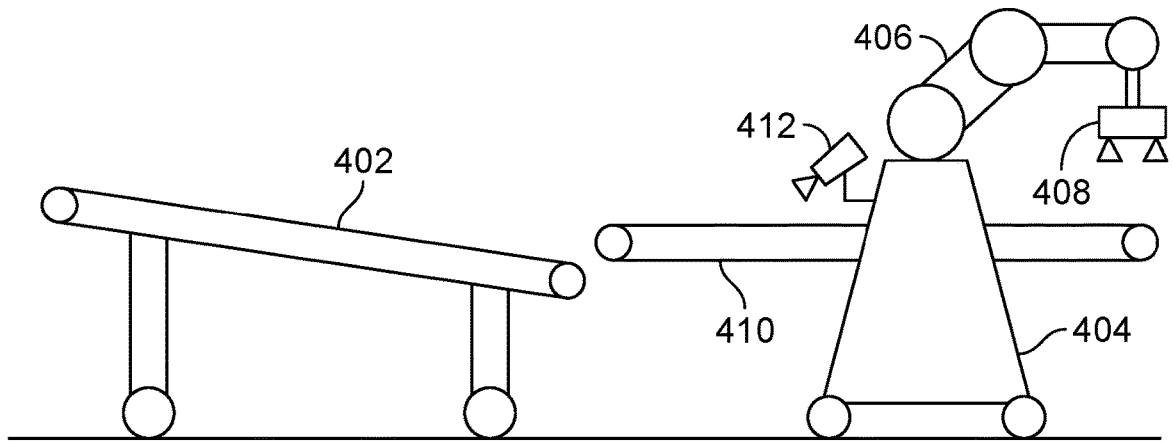
FIGS. 4A and 4B show a side view of a conveyor 402 and a robotic truck loader comprising a mobile and/or repositionable base 404, one or more robotic arms 406, a suction or other end effector 408, and integrated conveyor belt 410, and one or more cameras 412.
Figure 4B:
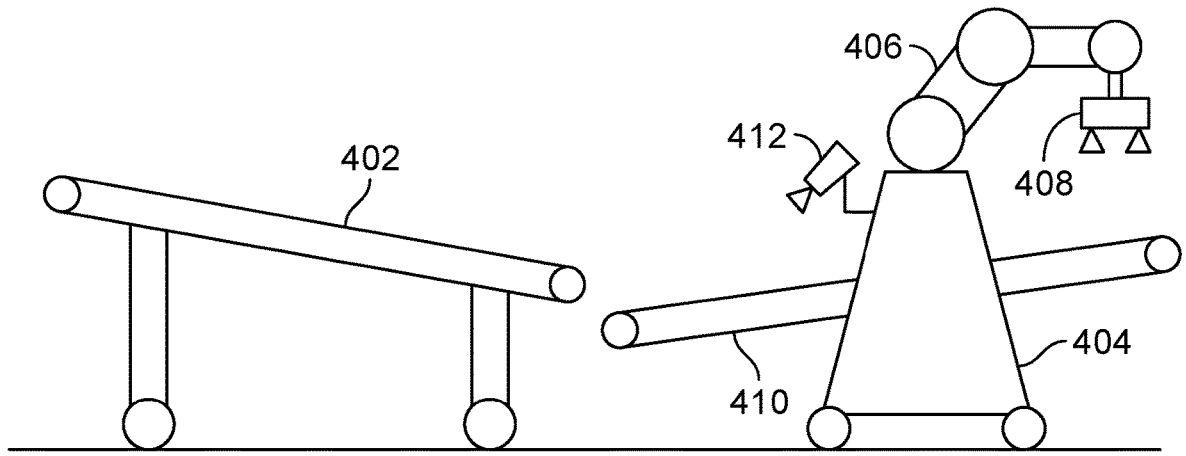

FIGS. 4A and 4B show a side view of a conveyor 402 and a robotic truck loader comprising a mobile and/or repositionable base 404, one or more robotic arms 406, a suction or other end effector 408, and integrated conveyor belt 410, and one or more cameras 412. In some embodiments, the robotic truck loader includes one or more of the structures and features disclosed and described in Appendix A.

In various embodiments, a control computer comprising and/or configured to control the robotic truck loader of FIGS. 4A and 4B uses image data from camera 412 and/or other sensor data, user input, and/or context data to configure the robotic truck loader to load or unload, as appropriate, including by adjusting a tilt angle of the conveyor 410 to align the end of conveyor 410 that is adjacent to conveyor 402 at a height determined at least in part on the perceived height of the adjacent end of conveyor 402. For example, to unload, the control computer may adjust the angle (and/or height) of conveyor 410 to the relative position shown in FIG. 4A, so that items grasped from within the truck or other conveyor, e.g., using robotic arm 406 and end effector 408, and placed on the conveyor 410 at the right end and then moved along the conveyor 410 to the left end will, upon exiting conveyor 410 slide onto the receiving end of conveyor 402. Conversely, to load, the control computer may adjust the angle (and/or height) of conveyor 410 to the relative position shown in FIG. 4B, so that items arriving via the conveyor 402 will slide onto the left end of conveyor 410 and can be conveyed by the conveyor 410 to the right end of conveyor 410, as shown, enabling the robotic arm 406 and end effector 408 to be used to pick the item from the conveyor 410 and load it into the truck or other container.

In various embodiments, sensors other than or in addition to a camera, such as camera 412, may be used to determine the absolute and/or relative positions of various conveyance structures, and/or to adjust the position and/or configuration as needed to assemble a desired end-to-end path. For example, RF tags and readers, GPS transponders and receivers, LIDAR or other sensing technologies may be used.

While in the example shown in FIGS. 4A and 4B a robotic truck loader includes an integrated conveyor 410 that runs between two robotic arms and is mounted on the same mobile chassis as the robotic arms, in other embodiments there is no conveyor mounted on the chassis. Instead, the robotic truck loader is positioned in a truck or container to be loaded or unloaded and a conveyor or other conveyance structures in positioned between the robotic arms, enabling the robotic arms to pick items from and/or place items on the non-integrated conveyance structure.

Figure 4C:
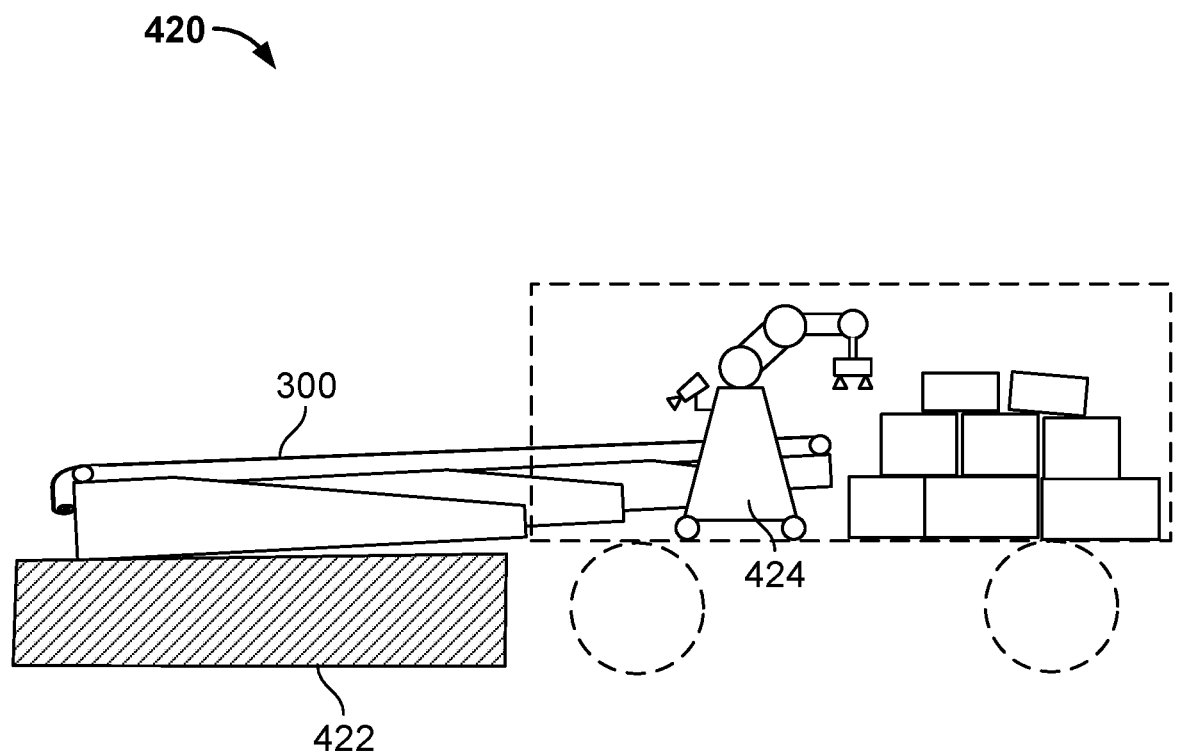
FIG. 4C is a diagram illustrating an embodiment of a system configured to use one or more robots and/or robotically controlled instrumentalities to plan, assemble, and configure a conveyance path.

FIG. 4C is a diagram illustrating an embodiment of a system configured to use one or more robots and/or robotically controlled instrumentalities to plan, assemble, and configure a conveyance path. In the example shown, a conveyance path 420 has been assembled, e.g., by one or more robots, comprising an extendable conveyor belt 300 of the type shown in FIGS. 3A and 3B extended from a loading dock 422 into an adjacent truck (shown in dashed lines) and extending through and between the robotic arms of a robotic truck loader 424 comprising two robotic arms between which the conveyor 300 has been extended, enabling the truck loader 424 to place items directly on or pick items directly from the conveyor 300. In the example shown, the conveyor 300 has been configured/positioned at least in part, e.g., by a robot, to tilt upward from the loading dock 422 at an angle such that a bottom of the conveyor 300 clears both the loading dock 422 and the truck bottom edge and extends through the robotic truck loader 424 at a height such that the conveyor 300 clears the mobile chassis of the robotic truck loader 424 and extends through and between the robotic arms of the robotic truck loader 424. In various embodiments, the angle of the conveyor 300 required to clear all structures would be computed by a robot participating in configuring the conveyance path 420 and/or the conveyor 300 would be configured and/or positioned by one or more robots participating in configuring the conveyance path 420.

Figure 5:
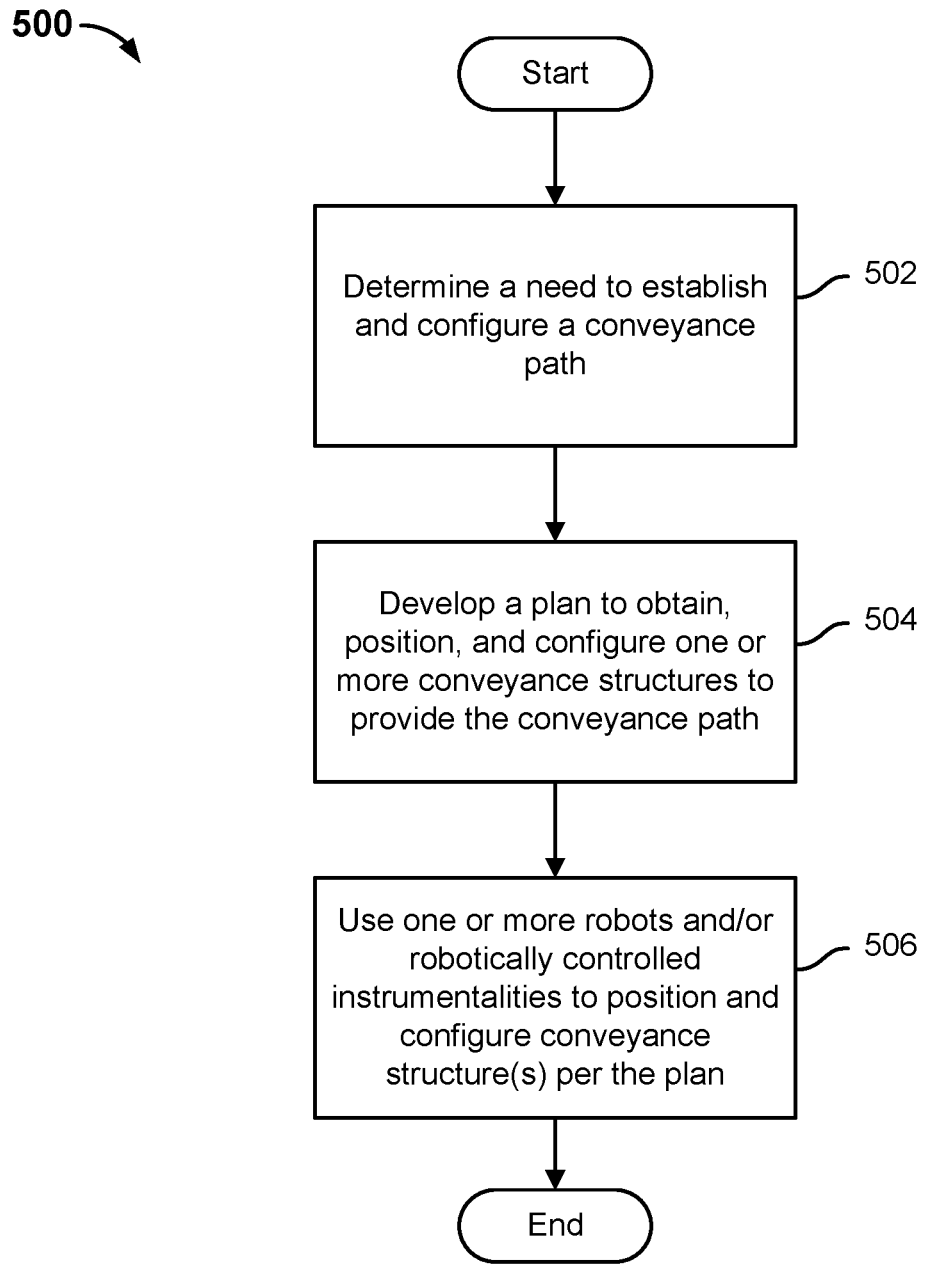
FIG. 5 is a flow diagram illustrating an embodiment of a process to use one or more robots and/or robotically controlled instrumentalities to plan, assemble, and configure a conveyance path.

FIG. 5 is a flow diagram illustrating an embodiment of a process to use one or more robots and/or robotically controlled instrumentalities to plan, assemble, and configure a conveyance path. In various embodiments, the process 500 of FIG. 5 may be performed by one or more control computers, such as control computer 116 in the example shown in FIG. 1. In the example shown, at 502 an indication is received to establish and configure a conveyance path. For example, an indication may be received that a truck or other container has been positioned or will at a specified or approximate future time be positioned at a specific unloading area, such as at a loading/unloading dock area. The information received at 502 may include and/or may be used to obtain one or more of information concerning the items to be loaded or unloaded; the order in which items will be loaded or unloaded; destinations to which items to be unloaded are to be provided, in the case of an operation to unload; source from which items to be loaded are to be obtained, in the case of an operation to load; etc.

At 504, a plan is developed to provide the required conveyance path by obtaining, positioning, coupling, and otherwise configuring one or more conveyance structures, e.g., conveyance structures such as those shown in FIGS. 1, 2A, 2B, 3A, 3B, 4A and 4B. The plan may include an identification of which (types of) conveyance structure(s) to use, in which order, and how each will be positioned, configured, and/or otherwise deployed to provide a continuous conveyance path, e.g., from a truck, container, pallet, or other source of items to an internal location within a warehouse or other logistics facility, in the case of an operation to unload, or from a source of items to a truck, container, palletization area, or other destination location, in the case of an operation to load, pack, or palletize, for example.

At 506, one or more robots and/or robotically controlled instrumentalities is/are used to position and configure conveyance structure(s) according to the plan developed at 504. For example, a mobile robot, such as robot 118 of FIG. 1, may be used to move a conveyance structure into position. In the case of an extending conveyance structure, such as conveyance structure 112 of FIG. 1 and the example shown in FIGS. 2A and 2B, a robot may position a first end of the conveyance structure at a first location, locking the first end in place, such as by locking a set of wheels, affixing a connector structure to an anchor point or an adjacent conveyance structure, etc., and then pull the opposite end to a second location.

In various embodiments, conveyance structures may be deployed and/or configured in a variety of ways suitable for a given conveyance structure and/or the adjacent structures with which the conveyance structure will interoperate to provide the conveyance path. For example, the respective heights of the adjacent ends of a pair of conveyance structures may be adjusted to provide for the flow of items from a destination or egress end of a first conveyance structure to a source/ingress end of an adjacent conveyance structure. Bridges, connectors, and/or similar structures may be deployed, adjusted, and/or otherwise configured to provide a continuous path between the two conveyance structures.

In some embodiments, a conveyance structure may facilitate movement of items along a conveyance path, rather than comprising part of the path. For example, a robotically controlled conveyance structure may be used to push items along the conveyance path, as/if needed. Camera or other sensor information may be used to monitor the flow of items along the conveyance path. If an item is observed to not being moving along the conveyance path, or is not moving at an expected or desired rate, a robotically controlled conveyance structure may be used to push the item, with a computed degree of force, along the path. In another example, a conveyance structure may be used to gate items, e.g., to space them apart as the flow along the conveyance path, e.g., to not overload one or more robots and/or other workers or equipment handling items at the far end (or other downstream point) of the conveyance path.

In various embodiments, one or more tasks to position, connect, and/or configure one or more conveyance structures to provide a conveyance path may be assigned to one or more human workers. A human worker may be scheduled to perform a given task at a given time and/or upon completion of a task on which the task to be performed by the human worker depends. For example, a mobile robot may position an ingress end of a first conveyance structure adjacent to the egress end of a second conveyance structure, and a human worker may be used to connect the conveyance structures, such as by manually manipulating a coupling or other structure to connected them and/or by deploying a bridge or other connector between them. In another example, a human worker may be used to adjust the height of one or the other of the two conveyance structures, to facilitate the transfer of items between them. A human worker may be scheduled to perform a task or, in some embodiments, assistance from a human worker may be invoked as a need arises, e.g., a robot assigned to perform a task is not able to complete the task.

In various embodiments, the plan developed at 504 may include one or more events, triggers, or other contingencies, which must occur prior to a next set of tasks being performed. For example, the system may be configured to wait until it receives a notification, e.g., from a mobile robot, that a specific conveyance structure has been positioned before dispatching another robot and/or a human worker to perform a related task, such as connecting the conveyance structure to another structure or otherwise configuring the conveyance structure to operate. In some embodiments, the system may use cameras or other sensors (e.g., contact, force, pressure, electrical continuity) to detect that a prerequisite task on which another task is contingent has been completed. For example, computer vision may be used to detect that a conveyance structure has been placed in a position in which the conveyance structure is required to be to enable a subsequent task to be completed.

While in a number of examples described herein a mobile or other robot positions, connects, and/or configures a conveyance structure, in various embodiments a robotically controlled instrumentality comprising a conveyance structure may be used. For example, a conveyance structure may include an electromechanical mechanism to adjust the height of its egress and/or ingress end. Examples of an electromechanical mechanism to adjust the height include, without limitation, hydraulics, pneumatic actuators, jacks, motor operated cables or gears, and linear actuators, A mobile robot, human worker, or remote robotic application process may control the electromechanical mechanism to configure the conveyance structure.

In some embodiments, a mobile robot may operate a crank, level, knob, handle, or other physical control structure of a conveyance structure to adjust the height of the conveyance structure and/or to otherwise configure the conveyance structure to operate. In some embodiments, a mobile robot may grasp, insert, and use a tool to configure the conveyance structure, such as a tool on or near the conveyance structure or a tool carried by the mobile robot or integrated into an end effector of the mobile robot.

Figure 6:
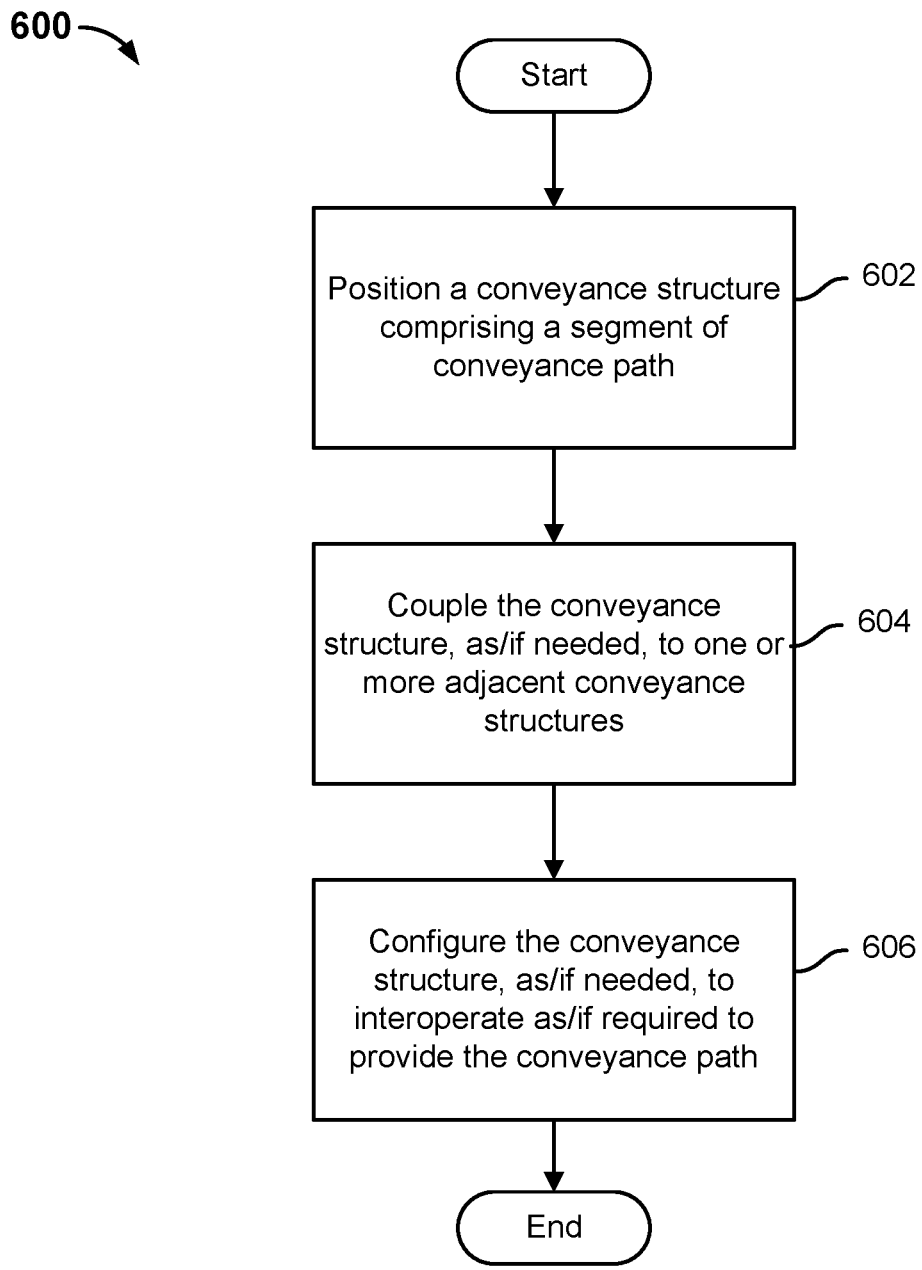
FIG. 6 is a flow diagram illustrating an embodiment of a process to assemble and configure a conveyance path.

FIG. 6 is a flow diagram illustrating an embodiment of a process to assemble and configure a conveyance path. In various embodiments, the process 600 of FIG. 6 may be performed by one or more control computers, such as control computer 116 in the example shown in FIG. 1. In the example shown, at 602, a conveyance structure comprising a segment of a conveyance path is positioned. At 604, the conveyance structure positioned at 602 is coupled to/with one or more adjacent conveyance structures, as/if needed. At 606, the conveyance structure is configured, as/if needed, to interoperate with one or more other conveyance structures to provide the conveyance path.

The process 600 is repeated for each conveyance structure comprising a conveyance path, until the entire conveyance path has been established. In various embodiments, a mobile robot and/or a robotic instrumentality comprising a conveyance structure may act, entirely or in part autonomously, to perform one or more of the steps of process 600 with respect to a given conveyance structure.

Figure 7:
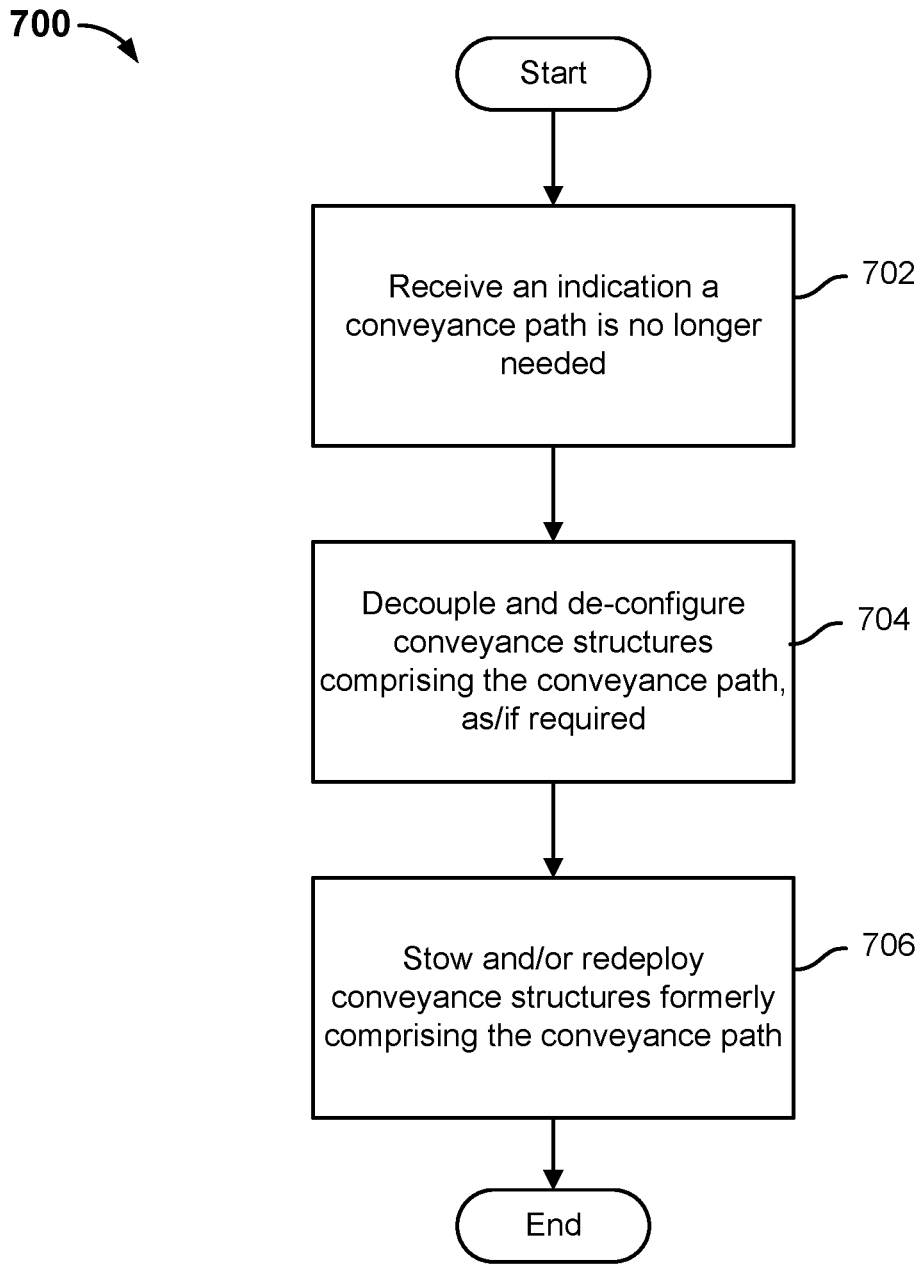
FIG. 7 is a flow diagram illustrating an embodiment of a process to disassemble a conveyance path.

FIG. 7 is a flow diagram illustrating an embodiment of a process to disassemble a conveyance path. In various embodiments, the process 700 of FIG. 7 may be performed by one or more control computers, such as control computer 116 in the example shown in FIG. 1. In the example shown, at 702, an indication is received that a conveyance path is no longer needed. For example, a truck or container that was loaded or unloaded may have become fully loaded or unloaded. At 704, conveyance structures comprising the conveyance path are decoupled and/or de-configured, as/if required. For example, one or more mobile robots may be deployed to disconnect adjacent conveyance structures, stow bridges or other connecting structures, and restore conveyance structure mechanisms to default or stow settings, such as lowest or other default height. At 706, conveyance structures are stowed, e.g., in a staging or storage area, and/or redeployed for use to provide other conveyance paths, if needed.

Figure 8:
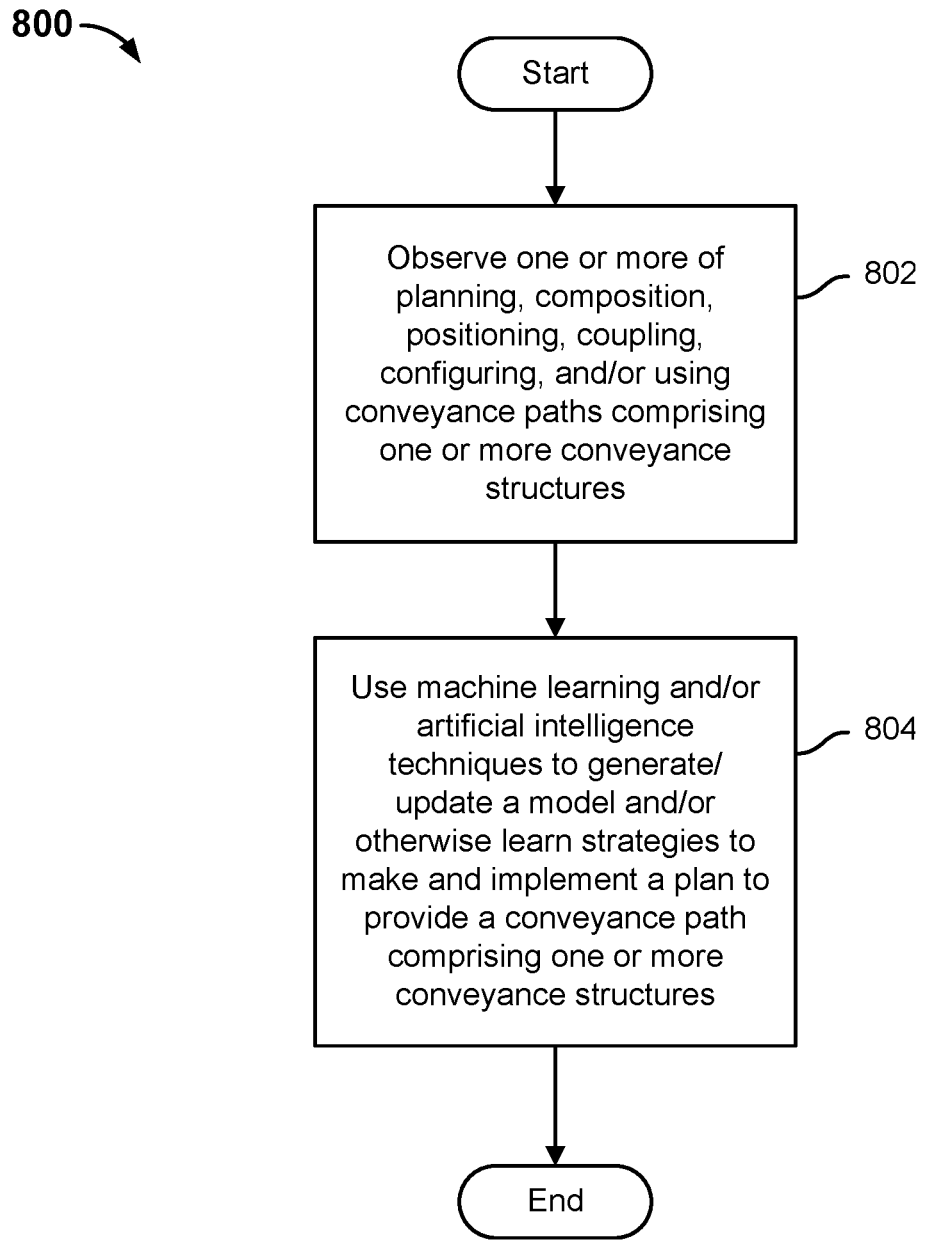
FIG. 8 is a flow diagram illustrating an embodiment of a process to learn to use and/or better use one or more robots and/or robotically controlled instrumentalities to plan, assemble, and configure a conveyance path.

FIG. 8 is a flow diagram illustrating an embodiment of a process to learn to use and/or better use one or more robots and/or robotically controlled instrumentalities to plan, assemble, and configure a conveyance path. In various embodiments, the process 800 of FIG. 8 may be performed by one or more control computers, such as control computer 116 in the example shown in FIG. 1. In the example shown, at 802, the planning (selection of conveyance structures and how to arrange, connect, and configured them), composition (e.g., which conveyance structures are used), positioning (how conveyance structures are positioned or arranged to form a path), coupling (how conveyance structures are connected), configuring (how conveyance structures are configured to provide a conveyance path), etc. are observed. For example, lists of conveyance structures and the order, positions, and orientations in which they are used may be received, or video or other image data showing the conveyance path being assembled and/or used may be received. At 804, machine learning and/or artificial intelligence techniques are used to generate and/or update a model and/or otherwise learn how to (better) make and implement a plan to provide a conveyance path using one or more conveyance structures. Use of a conveyance path may be observed to discern how well a plan and its implementation supported successful completion of a set of tasks, such as unloading a truck or other container. In some embodiments, conveyance paths established by human workers may be observed, enabling a robotic system as disclosed herein to learn to generate and implement a plan to select, arrange, position, connect, configure, and/or operate one or more conveyance structures to provide a conveyance path as disclosed herein.

In various embodiments, the machine learning model or other representation or repository of learn knowledge may be used by a robotic system as disclosed herein to generate and implement, with full or maximal autonomy, a plan to select, arrange, position, connect, configure, and/or operate one or more conveyance structures to provide a conveyance path in a given context for a given set of inputs, such as the loading dock at which a truck will be parked, the nature, number, size, weight, fragility, etc. of the contents to be unloaded, and the destination(s) to which the contents are to be provided, etc.

In some embodiments, such as to unload a truck or other container, a conveyance path as disclosed herein may include at the truck/container and one or more robot loaders/unloaders, such as those shown in FIGS. 4A and 4B. In some embodiments, a robotic loader/unloader may be deployed under its own power, such as by driving itself on a robotically controlled power chassis into the truck or container to be loaded/unloaded. Other elements comprising the conveyance path, such as extender-type conveyances, may next be deployed or extended to a position adjacent to the robotic loader/unloader, and so on, until a continuous path from/to the truck or other container to/from an opposite end of the conveyance path has been established.

In some embodiments, a system as disclosed herein may be configured to use one or more test loads of known size, weight, etc. to test the operation of a conveyance path created as described herein. For example, in the truck unloading context, a test item may be placed on the conveyance path at the truck end and sent to the far end of the path, to ensure a smooth and continuous pathway has been provided. If not, a robotic system as disclosed herein may deploy one or more mobile robots to make adjustments or address failures, and/or may invoke the assistance of one or more human workers if adjustments/corrections cannot be made fully autonomously.

While in some embodiments a fully automated and autonomous robotic system is used to position and configure a conveyance path for truck or other container loading and unloading, in various embodiments the efforts of human workers may be incorporated. For example, humans may position manually movable conveyance structures, may connect one structure to another, may adjust the height of structures to align them, etc.

In various embodiments, techniques disclosed herein may be used to provide an interoperable, integrated, and in some embodiments fully automated system to position and configure conveyance structures to move boxes or other items between locations within a warehouse, distribution, or similar facility, such as from storage or staging locations to a truck or other container, or from a truck or other container to storage or staging locations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
   a communication interface; and
   a processor coupled to the communication interface and configured to:
   receive via the communication interface an indication to establish a conveyance path to convey one or more items from a source location at an originating end of the conveyance path to a destination location at a terminating end of the conveyance path;
   determine programmatically a plan to arrange and configured one or more conveyance structures to provide the conveyance path; and
   invoke one or more robots to position, couple as needed, and configure as needed the one or more conveyance structures to provide the conveyance path;
   wherein a robot included in the one or more robots is configured to perform a conveyance path building task at least partly autonomously and the processor is configured to assign to the robot an assignment to perform the conveyance path building task at least partly autonomously.

2. The system of claim 1, wherein the processor is configured to include in the plan one or more tasks to be completed by a mobile robot and to control the mobile robot to perform the one or more tasks.

3. The system of claim 1, wherein the processor is configured to include in the plan one or more tasks to be completed by a human worker and to schedule or otherwise cause the human worker to perform the one or more tasks.

4. The system of claim 1, wherein the processor comprises one or both of a plurality of processors and a plurality of processing cores.

5. The system of claim 1, wherein the one or more robots includes one or more mobile robots.

6. The system of claim 1, wherein the one or more robots includes one or more robotically controlled instrumentalities of one or more of said conveyance structures.

7. The system of claim 1, wherein the processor is configured to use one or more of said one or more robots to position a conveyance structure included in said one or more conveyance structures to define at least a partial conveyance path from an ingress end of the conveyance structure to an egress end of the conveyance structure.

8. The system of claim 7, wherein said conveyance structure comprises a first conveyance structure, said ingress end comprises a first ingress end, and said egress end comprises a first egress end; and wherein the processor is configured to use one or more of said one or more robots to couple the first egress end of the first conveyance structure to a second ingress end of a second conveyance structure.

9. The system of claim 8, wherein the processor is further configured to use one or more of said one or more robots to configure one or both of the first conveyance structure and the second conveyance structure.

10. The system of claim 9, wherein the processor is configured to use one or more of said one or more robots to configure one or both of the first conveyance structure and the second conveyance structure at least in part by adjusting a respective height of one or both of the first conveyance structure and the second conveyance structure.

11. The system of claim 9, wherein the processor is configured to use one or more of said one or more robots to configure one or both of the first conveyance structure and the second conveyance structure at least in part by positioning a connection structure between the first conveyance structure and the second conveyance structure.

12. The system of claim 11, wherein the connection structure comprises a bridge configured to convey an item from the first egress end of the first conveyance structure to the second ingress end of a second conveyance structure.

13. The system of claim 1, wherein the conveyance path building task comprises one or more of the following: positioning a conveyance structure included in the one or more conveyance structures to define at least a portion of the conveyance path; connecting a first conveyance structure to a second conveyance; and configuring a conveyance structure included in the one or more conveyance structures.

14. The system of claim 1, wherein the processor is further configured to receive via the communication interface sensor data usable by the processor to determine programmatically the plan to arrange and configured one or more conveyance structures to provide the conveyance path; and invoke one or more robots to position, couple as needed, and configure as needed the one or more conveyance structures to provide the conveyance path.

15. A robotic system, comprising:
a communication interface; and
a processor coupled to the communication interface and configured to:
receive via the communication interface an indication to establish a conveyance path to convey one or more items from a source location at an originating end of the conveyance path to a destination location at a terminating end of the conveyance path;
determine programmatically a plan to arrange and configured one or more conveyance structures to provide the conveyance path; and
invoke one or more robots to position, couple as needed, and configure as needed the one or more conveyance structures to provide the conveyance path;
wherein the processor is further configured to receive via the communication interface an indication that the conveyance path is no longer needed and to use said one or more robots to break down the conveyance path and stow or redeploy the one or more conveyance structures.

16. A robotic system, comprising:
a communication interface; and
a processor coupled to the communication interface and configured to:
receive via the communication interface an indication to establish a conveyance path to convey one or more items from a source location at an originating end of the conveyance path to a destination location at a terminating end of the conveyance path;
determine programmatically a plan to arrange and configured one or more conveyance structures to provide the conveyance path; and
invoke one or more robots to position, couple as needed, and configure as needed the one or more conveyance structures to provide the conveyance path;
wherein the processor is further configured to observe one or more of the planning, positioning, coupling, configuring, and using of one or more of said one or more conveyance structures to provide one or more training conveyance paths and to learn based at least in part on said observing to determine programmatically the plan to arrange and configured said one or more conveyance structures to provide the conveyance path; and invoke said one or more robots to position, couple as needed, and configure as needed said one or more conveyance structures to provide the conveyance path.

17. The system of claim 1, wherein the one or more conveyance structures includes a plurality of different types of conveyance structure.

18. A method, comprising:
receiving via a communication interface an indication to establish a conveyance path to convey one or more items from a source location at an originating end of the conveyance path to a destination location at a terminating end of the conveyance path;
determining programmatically a plan to arrange and configured one or more conveyance structures to provide the conveyance path; and
invoking one or more robots to position, couple as needed, and configure as needed the one or more conveyance structures to provide the conveyance path;
wherein a robot included in the one or more robots is configured to perform a conveyance path building task at least partly autonomously and the further comprises assigning to the robot an assignment to perform the conveyance path building task at least partly autonomously.

19. A computer program product embodied in a non-transitory computer readable medium and comprising computer instructions for:
receiving via a communication interface an indication to establish a conveyance path to convey one or more items from a source location at an originating end of the conveyance path to a destination location at a terminating end of the conveyance path;
determining programmatically a plan to arrange and configured one or more conveyance structures to provide the conveyance path; and
invoking one or more robots to position, couple as needed, and configure as needed the one or more conveyance structures to provide the conveyance path;
wherein a robot included in the one or more robots is configured to perform a conveyance path building task at least partly autonomously and further comprising computer instructions to assign to the robot an assignment to perform the conveyance path building task at least partly autonomously.

* * * * *